S. TAKASAKI AND J. MIYAMOTO.
SECONDARY COIL.
APPLICATION FILED MAR. 14, 1917.
1,311,725.
Patented July 29, 1919.
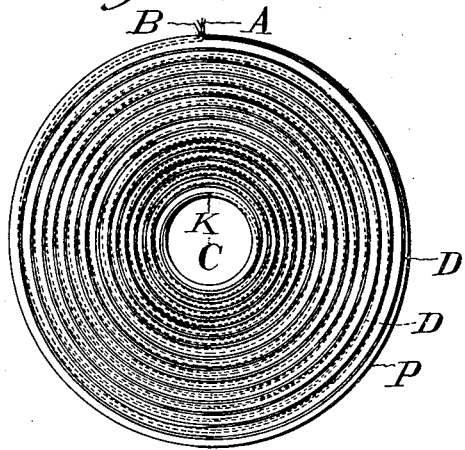
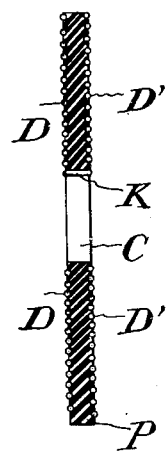
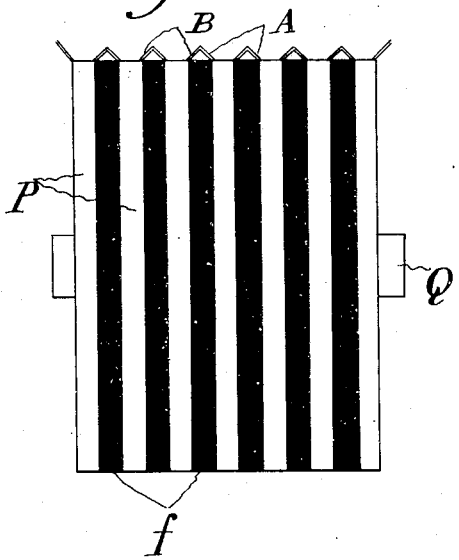
Inventors
Shojiro Takasaki and
Jutaro Miyamoto,
By B. Singer, Attorney

UNITED STATES PATENT OFFICE.

SHOJIRO TAKASAKI AND JUTARO MIYAMOTO, OF SHIGA-KEN, JAPAN.

SECONDARY COIL.

1,311,725. Specification of Letters Patent. Patented July 29, 1919.

Application filed March 14, 1917. Serial No. 154,897.

*To all whom it may concern:*

Be it known that we, SHOJIRO TAKASAKI, engineer, a subject of the Emperor of Japan, and resident of No. 104 Oaza Kawahara, Hikone-Machi, Inukami-Gun, Shiga-Ken, Japan, and JUTARO MIYAMOTO, engineer, a subject of the Emperor of Japan, and a resident of No. 55 Oaza Dobashi, Hikone-Machi, Inukami-Gun, Shiga-Ken, Japan, have invented an Improvement in Secondary Coils, of which the following is a specification.

This invention has for its object to provide an improved secondary coil for use in connection with induction coils, transformers, or the like.

The specific objects of this invention are to construct a device of the above character which will be inexpensive in manufacture, its sections capable of replacement, quickly assembled by a workman of ordinary skill, to provide the minimum protection against breakage of any part of the secondary coil due to any partial strain in handling the same, and in the event of such breakage occurring to enable the operator to detect the point at which the same has occurred and replace the individual unit damage.

In order that our invention may be more readily understood we have appended hereto one sheet of drawings in which:—

Figure 1 is a side elevation.

Fig. 2 is a transverse section.

Fig. 3 an end elevation showing a number of our secondary coils grouped together in operative manner around a primary coil.

Referring more particularly to the above figures, it will be seen that the reference letter A represents one end of the wire used in connection with secondary coils from which end the wire extends in the form of a spiral inwardly toward the opening C formed in the plate P. This plate P is constructed of some good electrical non-conducting material, such as gutta-percha, which is normally hard but under the influence of heat, will become fluid. It will be noted that the wire, after having made its innermost turn around the opening C which is provided for the reception of the primary coil, bridges the same as at K and extends in gradually widened spirals over the other face of the plate C, and at C', terminating in the end B adjacent the opposite end A. In connection with the above it will be noted that we prefer to arrange the coils D' slightly staggered with respect to the coils D, so as to prevent any possibility of a bridging across of the current in a thin spot in the plate P.

As aforestated, the plate P is preferably formed of a substance similar to gutta-percha, which will become plastic under heat, and the preferable way of applying the coils to the plate P is to heat the latter until they become softened and then apply the wire D and D', pressing the same into the surface of the plate P which, upon hardening, retains the wires in applied position.

Having constructed a number of individual units such as aforedescribed, we assemble the same around the primary coil Q, as indicated in Fig. 3, by placing one of the plates P around the same and interposing insulators of any approved type, between this unit and the next adjacent one, the wires A and B of the next adjacent unit being connected together by any suitable bridging means, as also indicated in Fig. 3.

Having thus described our invention, what we claim is:—

1. A secondary coil including a number of units, each unit comprising a disk of insulating material formed with an opening through its center for the reception of a primary coil, a single piece of wire embedded in the faces of said disk and entering the same at its periphery and extending in gradually narrowing spirals to a point adjacent the opening in said disk, then bridging through to the other face of said disk and extending in gradually widened spirals to a position adjacent the outer periphery of said disk and disks of insulating material placed between each unit.

2. A secondary coil unit comprising a disk of insulating material formed with an opening through its center for the reception of a primary coil, a single piece of wire embedded in the faces of said disk and entering the same at its periphery and extending in gradually narrowing spirals to a point adjacent the opening in said disk, then bridging through to the other face of said disk and extending in gradually widening spirals to a position adjacent the outer periphery of said disk.

In testimony whereof we affix our signatures in presence of two witnesses.

SHOJIRO TAKASAKI.
JUTARO MIYAMOTO.

Witnesses:
H. F. HAWLEY,
TOZO OKUBO.